US010500687B2

(12) United States Patent
Isobe et al.

(10) Patent No.: US 10,500,687 B2
(45) Date of Patent: Dec. 10, 2019

(54) MACHINE TOOL (71) Applicant: FANUC CORPORATION, Yamanashi (JP)

(72) Inventors: Gaku Isobe, Yamanashi (JP); Akihiko Fujimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/951,943

(22) Filed: Apr. 12, 2018

(65) Prior Publication Data
US 2018/0333814 A1    Nov. 22, 2018

(30) Foreign Application Priority Data

May 18, 2017    (JP) ................................ 2017-098863

(51) Int. Cl.
*B23Q 3/157*    (2006.01)
*B23Q 3/155*    (2006.01)
*G05B 19/18*    (2006.01)

(52) U.S. Cl.
CPC ...... *B23Q 3/15534* (2016.11); *B23Q 3/15706* (2013.01); *G05B 19/182* (2013.01); *B23Q 3/15503* (2016.11); *B23Q 2003/15586* (2013.01); *B23Q 2220/002* (2013.01); *G05B 2219/35354* (2013.01);
(Continued)

(58) Field of Classification Search
CPC ............ Y10T 483/16; Y10T 483/1752; Y10T 483/1755; Y10T 483/1757; Y10T 483/176; Y10T 483/1793; Y10T 483/1795; Y10T 483/1798; B23Q 3/15506; B23Q 3/15534;
(Continued)

(56) References Cited

U.S. PATENT DOCUMENTS 4,870,744 A * 10/1989 Araki ................. B23Q 3/15706
483/56
4,873,756 A * 10/1989 Yamane ............ B23Q 3/15706
483/56
(Continued)

FOREIGN PATENT DOCUMENTS

CN    101045281 A    10/2007
CN    104385028 A    3/2015
(Continued)

OTHER PUBLICATIONS

An Office Action mailed by the Chinese Patent Office dated Mar. 28, 2019, which corresponds to Chinese Patent Application No. 201810462869.6 and is related to U.S. Appl. No. 15/951,943; with English translation.

*Primary Examiner* — Sunil K Singh
*Assistant Examiner* — Michael Vitale
(74) *Attorney, Agent, or Firm* — Studebaker & Brackett PC (57) ABSTRACT

A tool magazine (40) is able to move among a machining position where a tool (2) attached to a spindle (30) machines a workpiece, a tool exchange position where the tool (2) attached to the spindle (30) is exchanged, and a retreat position where an automated workpiece carrying device is not disturbed in placing or removing of the workpiece with respect to a workpiece placing part (20). The workpiece is placed on the workpiece placing part (20) from above or removed upward from the workpiece placing part (20) by the automated workpiece carrying device.

5 Claims, 5 Drawing Sheets

(52) U.S. Cl.
CPC ... *G05B 2219/36503* (2013.01); *Y10T 483/16* (2015.01); *Y10T 483/1795* (2015.01); *Y10T 483/1873* (2015.01)

(58) Field of Classification Search
CPC ............. B23Q 3/1556; B23Q 3/15706; B23Q 3/15722
USPC ........ 483/14, 38, 39, 40, 41, 54, 55, 56, 57, 483/66, 67
See application file for complete search history.

(56) References Cited

U.S. PATENT DOCUMENTS

| | | | | |
|---|---|---|---|---|
| 6,394,892 | B2 * | 5/2002 | Hanisch | B23Q 1/52 451/177 |
| 9,050,695 | B2 | 6/2015 | Liu | |
| 2006/0094575 | A1 * | 5/2006 | Fujimoto | B23Q 16/025 483/39 |
| 2014/0256527 | A1 * | 9/2014 | Liu | B23Q 3/15706 483/54 |
| 2015/0298272 | A1 * | 10/2015 | Murata | B23Q 7/1431 414/222.07 |

FOREIGN PATENT DOCUMENTS

| | | | | |
|---|---|---|---|---|
| CN | 104416402 A | | 3/2015 | |
| CN | 204771769 U | | 11/2015 | |
| DE | 102010023278 A1 * | | 12/2011 | ............... B23Q 1/01 |
| JP | S60-127937 A | | 7/1985 | |
| JP | S64-051245 A | | 2/1989 | |
| JP | 2014-193495 A | | 10/2014 | |
| JP | 2015-054370 A | | 3/2015 | |
| WO | WO-2016059738 A1 * | | 4/2016 | ............... B23Q 1/26 |

* cited by examiner

MACHINE TOOL

This application is based on and claims the benefit of priority from Japanese Patent Application No. 2017-098863, filed on 18 May 2017, the content of which is incorporated herein by reference.

BACKGROUND OF THE INVENTION

Field of the Invention

The present invention relates to a machine tool for attaching and removing a tool by rotating a tool magazine to move the tool close to and away from a spindle.

Related Art

Conventionally, machine tools each capable of automatically exchanging a tool attached to a spindle of a machine tool have been known. In such a machine tool, tools necessary for machining an object to be machined are set in advance to a plurality of tool gripping parts radially disposed in a tool magazine. The tool attached to the spindle of the machine tool is automatically exchanged to another tool designated in accordance with the machining state of the object to be machined (refer to Patent Document 1, as an example).

Patent Document 1: Japanese Unexamined Patent Application, Publication No. 2015-054370

SUMMARY OF THE INVENTION

A conventional machine tool as described above has a known configuration in which a tool magazine is disposed on the front surface or the side surface of a spindle. A workpiece corresponding to an object to be machined is placed on a workpiece placing part on which a workpiece is to be placed in the machine tool, through an opening part of a cover member formed on the front surface or the side surface of the machine tool. The present configuration enables to make the operation small for exchanging tools with respect to the spindle, thereby enabling to shorten the time for tool exchanging.

Unlike the configuration as described above in which the workpiece is placed through the opening part of the cover member formed on the front surface or the side surface of the machine tool, on the workpiece placing part on which the workpiece is to be placed in the tool machine, another configuration is considered, for example, in which the workpiece is carried from above the machine tool and placed on the workpiece placing part disposed in a lower part of a tool magazine. In this case in the conventional machine tool, the distance is short between the tip of the tool gripped by the tool magazine and the cover member of the machine tool disposed to be opposed to the tool magazine. Therefore, the space is small, required for placing a workpiece on the workpiece placing part of the machine tool and for exchanging the workpiece placed on the workpiece placing part, thus making it difficult to automatically exchange the workpiece by using a gantry loader or the like.

The object of the present invention is to provide a machine tool for facilitating automatic exchanging of a workpiece from above by use of a gantry loader or the like.

(1) A machine tool (for example, a machining center 1 described below) according to the present invention includes a tool magazine (for example, a tool magazine 40 described below) having a plurality of tool gripping parts (for example, tool gripping parts 43 described below) radially disposed to be each capable of gripping a tool (for example, a tool 2 described below), a workpiece placing part (for example, a workpiece placing part 20 described below) with a workpiece placed on and removed from by an automated workpiece carrying device, the workpiece being to be machined by the tool, and a spindle (for example, a spindle 30 described below) subjected to attachment of the tool for machining the workpiece on the workpiece placing part. The tool magazine is able to move among a machining position where the tool attached to the spindle machines the workpiece, a tool exchange position where the tool attached to the spindle is exchanged, and a retreat position where the automated workpiece carrying device is not disturbed in placing or removing of the workpiece with respect to the workpiece placing part. The workpiece is placed on the workpiece placing part from above or removed upward from the workpiece placing part by the automated workpiece carrying device. The machine tool includes a tool magazine retracting part (for example, a rotary cam 175, an air cylinder 171 and a cam follower 413 described below) for moving the tool magazine to the retreat position and a controller (for example, a controller 60 described below) for controlling operation of placing and removing the workpiece with respect to the workpiece placing part by the automated workpiece carrying device and operation of the tool magazine retracting part in synchronism with each other.

(2) In the machine tool according to (1), a cover member (for example, a cover member C described below) including a wall part disposed so as to be opposed to the tool magazine in a horizontal direction may be included, and the tool magazine retracting part may retract the tool magazine so as to secure an enough space for the automated workpiece carrying device to vertically pass through between the wall part and the tool magazine.

(3) In the machine tool according to (1) or (2), the tool magazine may be rotatable centering on a magazine shaft part, and the tool magazine retracting part may have a rotary cam (for example, the rotary cam 175 described below) rotatable centering on a retracting-part shaft part parallel to the magazine shaft part, and a cam follower (for example, the cam follower 413 described below) following a cam surface (for example, a cam surface 177 described below) of the rotary cam and having a support point on the tool magazine.

(4) In the machine tool according to (3), the cam surface of the rotary cam may have such a curved surface that, as the rotary cam moves along the cam surface centering on the retracting-part shaft part, a distance from the retracting-part shaft part decreases gradually.

(5) In the machine tool according to (3) or (4), the tool magazine retracting part may include an air cylinder (for example, an air cylinder 171 described below) for rotating the rotary cam.

The present invention enables to provide a machine tool for facilitating automatic exchanging of a workpiece from above by use of a gantry loader or the like.

DETAILED DESCRIPTION OF THE INVENTION

Figure 1:
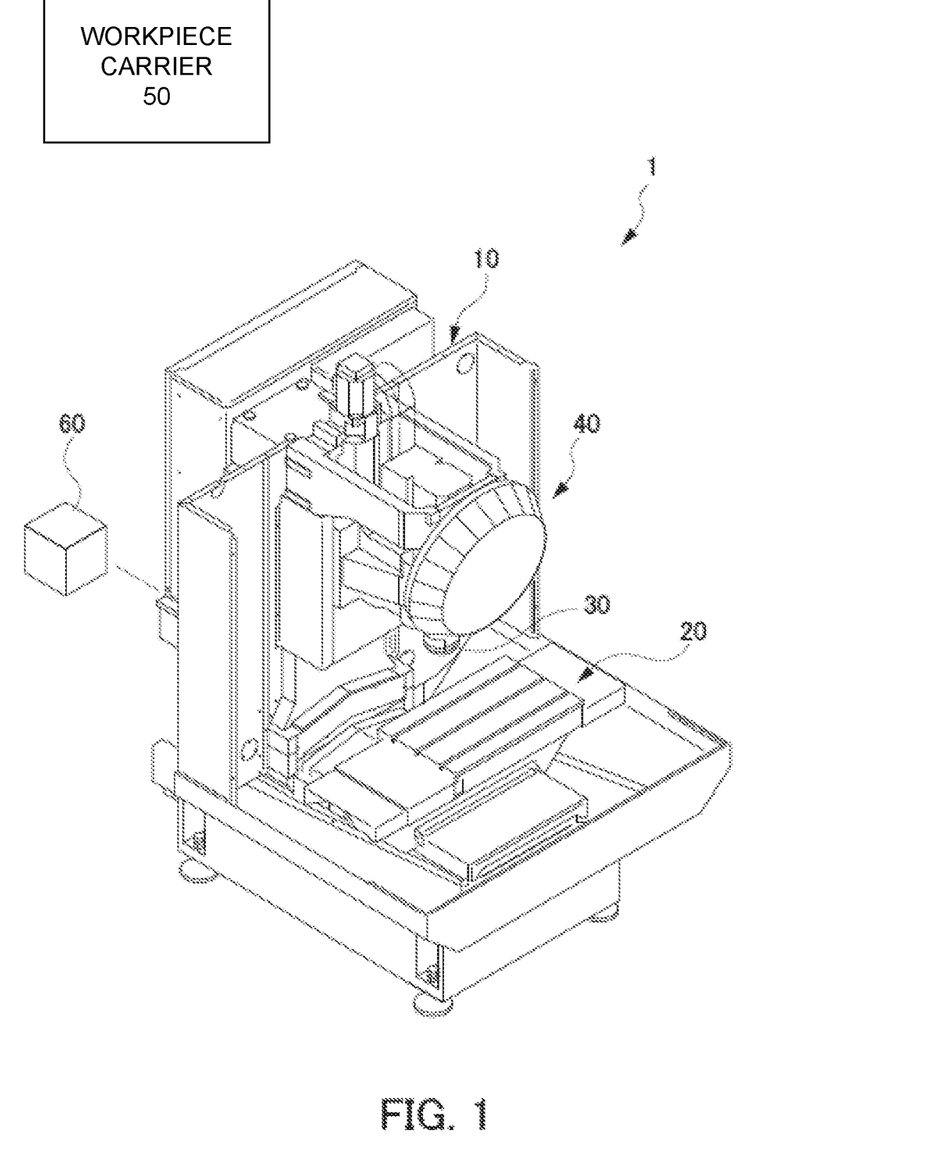
FIG. 1 is a perspective view illustrating a machining center 1 according to one embodiment of the present invention.

The embodiment of the present invention will be described below. FIG. 1 is a perspective view illustrating a machining center 1 according to one embodiment of the present invention. A machine tool according to the present embodiment includes the machining center 1.

As shown in FIG. 1, the machining center 1 includes a machine body 10, a workpiece placing part 20, a spindle 30, a tool magazine 40, a tool magazine retracting part (an air cylinder 171, a rotary cam 175 and a cam follower 413, which are described below), and a controller 60.

The tool magazine 40, which has a disk shape, is supported so as to be rotatable and swingable with respect to the machine body 10. The tool magazine 40 has a plurality of tool gripping parts 43 (refer to FIG. 2A and other figures). The plurality of tool gripping parts 43 are disposed at predetermined intervals in the circumferential direction of the tool magazine 40, that is, they are radially disposed in the tool magazine 40. Each of the plurality of tool gripping parts 43 is capable of gripping each tool 2 (refer to FIG. 2A and other figures).

Figure 2A:
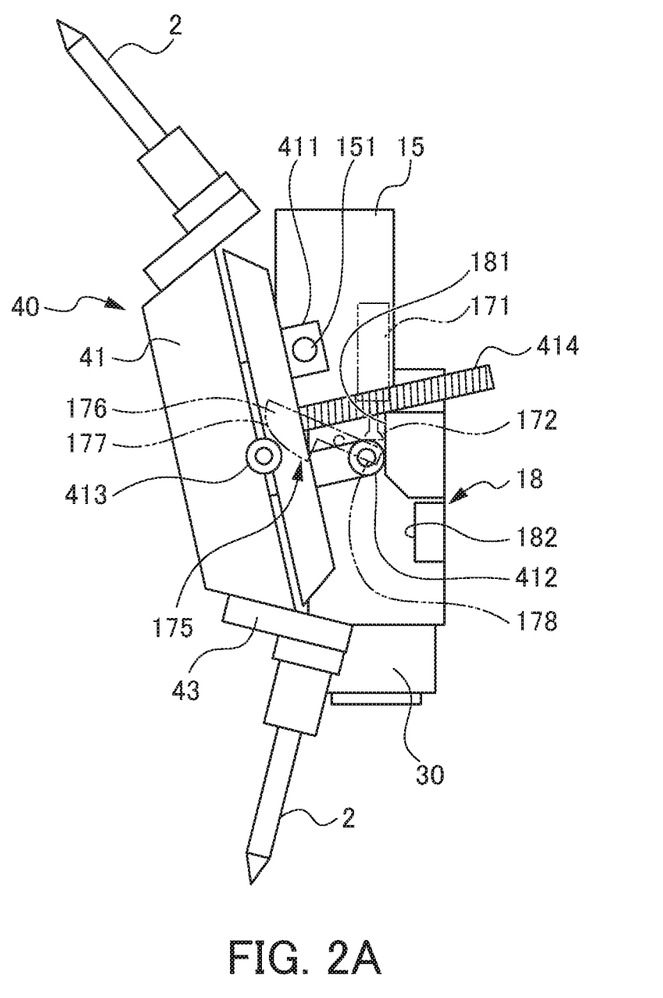
FIG. 2A is a side view illustrating a state in which a tool magazine 40 of the machining center 1 according to one embodiment of the present invention is in an operating position.
Figure 2B:
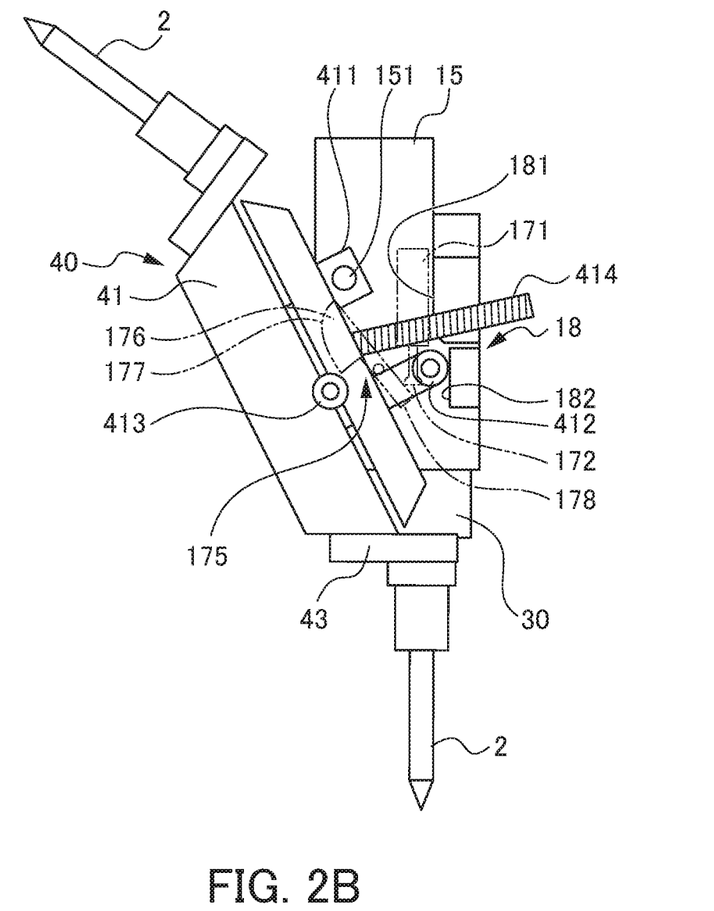
FIG. 2B is a side view illustrating a state in which the tool magazine 40 of the machining center 1 according to one embodiment of the present invention is in a tool attaching and detaching position.

A cover member C (refer to FIG. 3 and other figures) including a wall part is disposed in front of the tool magazine 40 in the horizontal direction (the lower right direction in FIG. 1) so as to be opposed to the tool magazine 40. In FIG. 1, FIG. 2A and FIG. 2B, illustration of the cover member C is omitted for convenience of explanation.

A workpiece is placed on the workpiece placing part 20. The tool 2 gripped by the tool magazine 40 is attachable to and detachable from the spindle 30. The spindle 30 to which the tool 2 is attached machines a workpiece placed on the workpiece placing part 20. An automated workpiece carrying device 50 including a gantry loader or the like places a workpiece from above the workpiece placing part 20 through a space (the space having a distance d2) between the cover member C (refer to FIG. 4 and other figures) and the tool magazine 40, or removes the workpiece upward with respect to the workpiece placing part 20. The tool magazine retracting part (the air cylinder 171, the rotary cam 175 and the cam follower 413, which are described below) moves the tool magazine 40 to a retreat position where the automated workpiece carrying device is not disturbed in placing or removing of the workpiece with respect to the workpiece placing part 20, when the automated workpiece carrying device places the workpiece from above the workpiece placing part 20 or removes the workpiece upward with respect to the workpiece placing part 20.

The controller 60 includes a CPU, a ROM and a RAM. The CPU reads, via a bus, a system program stored in the ROM, and also receives the signal input by a sensor (not shown) provided in each part, thereby controlling the air cylinder 171 and the like described below according to the system program to drive the rotary cam 175 and the like. The RAM stores temporary calculation data and display data.

In an example, the controller 60 controls the operation of placing and removing a workpiece with respect to the workpiece placing part 20 by the automated workpiece carrying device and the operation of the tool magazine retracting part in synchronism with each other, so as to make the automated workpiece carrying device place and remove a workpiece with respect to the workpiece placing part 20 when the tool magazine 40 is in the retreat position where the automated workpiece carrying device is not disturbed in placing or removing of the workpiece with respect to the workpiece placing part 20, as described below.

Figure 3:
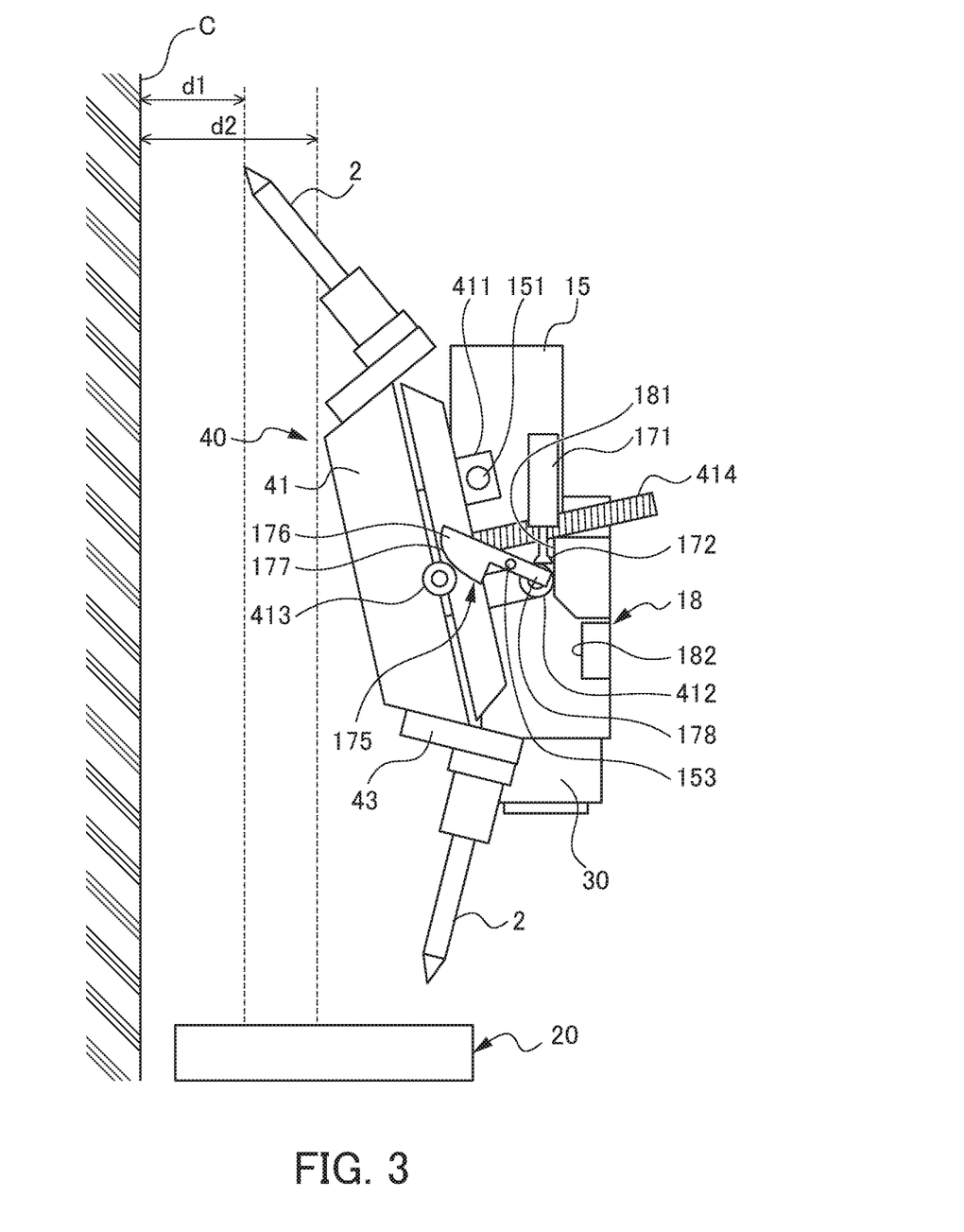
FIG. 3 is a side view illustrating a positional relation between the rotary cam 175 and the cam follower 413 when the tool magazine 40 of the machining center 1 according to one embodiment of the present invention is in the operating position.
Figure 4:
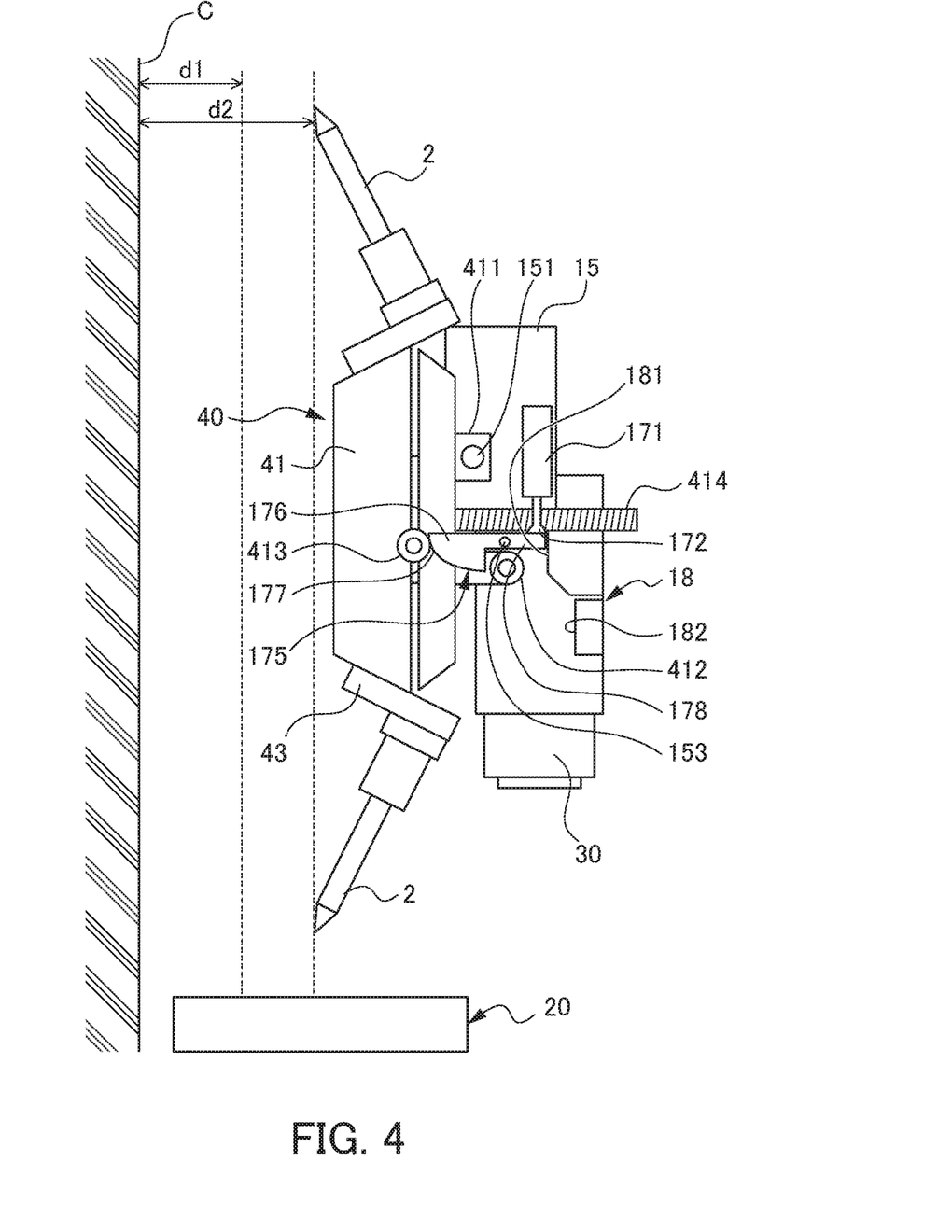
FIG. 4 is a side view illustrating a positional relation between the rotary cam 175 and the cam follower 413 when the tool magazine 40 of the machining center 1 according to one embodiment of the present invention is in a retreat position.

The following details are about the tool magazine 40 and the configuration for supporting the tool magazine 40. FIG. 2A is a side view illustrating a state in which the tool magazine 40 of the machining center 1 according to one embodiment of the present invention is in an operating position. FIG. 2B is a side view illustrating a state in which the tool magazine 40 of the machining center 1 according to one embodiment of the present invention is in a tool attaching and detaching position. FIG. 3 is a side view illustrating a positional relation between the rotary cam 175 and the cam follower 413 when the tool magazine 40 of the machining center 1 according to one embodiment of the present invention is in the operating position. FIG. 4 is a side view illustrating a positional relation between the rotary cam 175 and the cam follower 413 when the tool magazine 40 of the machining center 1 according to one embodiment of the present invention is in the retreat position.

The tool magazine 40 has a tool magazine body 41, and the tool magazine body 41 includes an energizing spring 414, a supported part 411, and a cam follower 412, and the cam follower 413. The supported part 411 is rotatably supported to the machine body 10 by a magazine shaft part 151 which is a rotary axis extending in the left-right direction (the direction connecting the front side and the back side of the page surface in FIG. 2A). The energizing spring 414 includes a tension spring, one end of which is fixed to a part below the supported part 411 of the tool magazine 40, and the other end of which is fixed to the machine body 10 (refer to FIG. 1). The energizing force of the energizing spring 414 brings the cam follower 412 described below into contact with cam surfaces 181 and 182 of a cam 18, or brings the cam follower 413 described below into contact with a cam surface 177 of the rotary cam 175.

The cam follower 412 extends rearward (rightward in FIG. 2A) from the rear surface (the right-side surface in FIG. 2A) of the tool magazine body 41. The extending end part of the cam follower 412 comes into contact with the cam 18, thereby following the cam surfaces 181 and 182 of the cam 18. As shown in FIG. 2A, the cam surface 181 which is an upper part of the cam 18 has a flat surface protruding most in the forward direction (leftward in FIG. 2A), and the cam surface 182 which is a lower part of the cam 18 has a flat surface retracted in the backward direction (rightward in FIG. 2A) with respect to the cam surface 181. The intermediate part thereof has an inclined surface connecting the cam surface 181 which is the upper part of the cam 18 and the cam surface 182 which is the lower part of the cam 18.

According to the configurations of the cam 18 and the cam follower 412, when the cam follower 412 follows the cam surface 181 which is the upper part of the cam 18 as shown in FIG. 2A, the tool magazine 40 is in a machining position where the tool 2 attached to the spindle 30 machines a workpiece. While when the cam follower 412 follows the cam surface 182 which is the lower part of the cam 18 as shown in FIG. 2B, the tool magazine 40 is in a tool exchange position where the tool 2 attached to the spindle 30 is exchanged. That is, as the cam follower 412 follows the cam surfaces 181, 182 of the cam 18, the tool magazine 40 rotates centering on the magazine shaft part 151, thereby moving between the machining position shown in FIG. 2A and the tool exchange position shown in FIG. 2B.

The tool magazine retracting part has the rotary cam 175, the cam follower 413, and the air cylinder 171. The air cylinder 171 is fixed to the machine body 10 (refer to FIG. 1 and other figures). As shown in FIG. 4 and other figures, an output shaft 172 of the air cylinder 171 is fixed to a piston (not shown) of the air cylinder 171 so as to move integrally with the piston, and the output shaft 172 extends downward from the bottom part of the air cylinder 171, and moves in the vertical direction integrally with the piston as the piston moves up and down. The bottom part of the output shaft 172 is in contact with a driven part 178 of the rotary cam 175 described below, whereby the rotary cam 175 rotates as the output shaft 172 moves up and down.

The rotary cam 175 has a cam part 176 and the driven part 178. As shown in FIG. 3 and other figures, the cam part 176 has a shape of one quadrant of an ellipse obtained by dividing the ellipse with the straight line passing through the two focal points thereof and the straight line which is perpendicular to the former straight line and which passes through the center of the ellipse.

As shown in FIG. 3 and other figures, the driven part 178 extends from the cam part 176 so as to extend the division line (linear part) of the cam part 176 having the shape of one quadrant of an ellipse. The cam part 176 and the driven part 178 are integrally connected to each other, and the part connecting the cam part 176 and the driven part 178 is rotatably supported to the machine body 10 by a retracting-part shaft part 153 serving as a rotary axis extending parallel to the magazine shaft part 151. Accordingly, the rotary cam 175 is rotatable centering on the retracting-part shaft part 153 by the retracting-part shaft part 153. The cam surface 177 of the rotary cam 175 has such a curved surface that, as the rotary cam 175 moves along the cam surface 177 centering on the retracting-part shaft part 153, the distance from the retracting-part shaft part 153 to the cam surface 177 decreases gradually (as the rotary cam 175 moves along the cam surfaces 177 in the opposite direction, the distance from the retracting-part shaft part 153 to the cam surface 177 gradually increases).

As shown in FIG. 4, the cam follower 413, which is disposed to be fixed to the tool magazine body 41, is able to come into contact with the cam surface 177 of the rotary cam 175. That is, the cam follower 413, which follows the cam surface 177 of the rotary cam 175, has a support point on the tool magazine 40.

According to the configurations of the cam surface 177 of the rotary cam 175 and the cam follower 413, the tool magazine 40 rotates centering on the magazine shaft part 151. When the cam follower 413 follows a vicinity part of the tip of the cam surface 177, as shown in FIG. 4, the tool magazine 40 is in the retreat position where the tool magazine 40 is retracted so as to be able to secure an enough space for the automated workpiece carrying device to vertically pass through between the wall part of the cover member C and the tool magazine 40. When the cam follower 413 follows a vicinity part of the base end part of the cam surface 177 (the part of the cam part 176 connected to the driven part 178), as shown in FIG. 3, the tool magazine 40 is in the machining position where the tool 2 gripped by the tool magazine 40 and attached to the spindle 30 machines a workpiece. That is, as the cam follower 413 follows the cam surface 177, the tool magazine 40 rotates centering on the magazine shaft part 151, thereby moving between the retreat position shown in FIG. 4 and the machining position shown in FIG. 2A and FIG. 3.

The operation of the tool magazine 40 is described below. As shown in FIG. 2A, when the cam follower 412 follows the upper part of the cam 18, the tool magazine 40 is in the machining position where the tool 2 attached to the spindle 30 machines a workpiece. From the state, as shown in FIG. 2B, the energizing force of the energizing spring 414 for energizing the lower part of the tool magazine 40 so as to pull it backward (rightward in FIG. 2A) causes the cam follower 412 to come into contact with and follow the lower part of the cam 18, and the tool magazine 40 rotates centering on the magazine shaft 151, whereby the main shaft 30 moves upward, and the tool magazine 40 is moved to be in the tool exchange position where the tool 2 attached to the spindle 30 is exchanged.

When the tool magazine 40 is in the machining position or the tool exchange position as described above, the tool 2 positioned above the tool magazine 40 is positioned in the vicinity of the wall part of the cover member C. Thus, as shown in FIG. 3, a distance d1 between the wall part of the cover member C and the tip of the tool 2 is short. Accordingly, the space between the wall part of the cover member C and the tool magazine 40 is narrow. At this time, the controller 60 controls and fixes, not driving, the air cylinder 171 as in the state shown in FIG. 3.

In order that a workpiece is placed on the workpiece placing part 20 or that a workpiece placed on the workpiece placing part 20 is removed, the control part 60 controls and drives the air cylinder 171, thereby rotating the rotary cam 175 in a clockwise direction. As a result, the cam follower 413 comes into contact with the cam surface 177 of the rotary cam 175, and moves relative to the cam surface 177 along the cam surface 177 so as to come into contact with the tip of the cam part 176 of the rotary cam 175. At this time as shown in FIG. 4, the diameter direction of the tool magazine 40 is set vertically, and a distance d2 between the wall part of the cover member C and the tip of the tool 2 is long. Accordingly, the space between the wall part of the cover member C and the tool magazine 40 is widened. At this time, the controller 60 controls and drives the automated workpiece carrying device in synchronism with the tool magazine 40 to carry and place a workpiece on the workpiece placing part 20 or to remove the workpiece placed on the workpiece placing part 20.

As described above, according to the present embodiment, the machining center 1 as a machine tool includes the tool magazine 40 having the plurality of tool gripping parts 43 radially disposed to be each capable of gripping the tool 2, the workpiece placing part 20 on which the automated workpiece carrying device places a workpiece to be machined by the tool 2 and from which the automated workpiece carrying device removes the workpiece, and the spindle 30 to which the tool 2 is attached to machine the workpiece on the workpiece placing part 20. The tool magazine 40 is able to move among the machining position where the tool 2 attached to the spindle 30 machines the workpiece, the tool exchange position where the tool 2 attached to the spindle 30 is exchanged, and the retreat position where the automated workpiece carrying device is not disturbed in placing or removing of the workpiece with respect to the workpiece placing part 20. The workpiece is placed on the workpiece placing part 20 from above or removed upward from the workpiece placing part 20 by the automated workpiece carrying device. The machining center 1 includes the rotary cam 175, the cam follower 413 and the air cylinder 171 which serve as the tool magazine retracting part for moving the tool magazine 40 to the retreat position, and the controller 60 for controlling the operation of placing and removing the workpiece with respect to the workpiece placing part 20 by the automated workpiece carrying device and the operation of the tool magazine retracting part in synchronism with each other.

When the tool magazine 40 is in the retreat position, the tool magazine 40 is positioned so that the automated workpiece carrying device is not disturbed in placing or removing of the workpiece with respect to the workpiece placing part 20. Accordingly, in an example, the automated workpiece carrying device including a gantry loader or the like is able to easily place the workpiece on the workpiece placing part 20 and to remove the workpiece placed on the placing part, from above the workpiece placing part 20.

As a result, in the case where a workpiece is automatically placed and removed with respect to the machining center 1, since the workpiece is placed and removed with respect to the workpiece placing part 20 from above the machining center 1, as compared with the case where a workpiece is placed and removed with respect to the machining center 1 from the front surface or the side surface thereof, the workpiece placing part 20 is enabled to be disposed so as to straddle the plurality of machining centers 1 above the plurality of machining centers 1 as an example, thereby enabling to reduce the installation area of the entire system including the machining centers 1.

The machining center 1 includes the cover member C including the wall part disposed so as to be opposed to the tool magazine 40 in the horizontal direction. The tool magazine retracting part (the air cylinder 171, the rotary cam 175 and the cam follower 413) retracts the tool magazine 40 so as to secure an enough space for the automated workpiece carrying device to vertically pass through between the wall part of the cover member C and the tool magazine 40.

This lengthens the distance between the tip of the tool 2 gripped by the tool magazine 40 and the cover member C of the machining center 1 disposed to be opposed to the tool magazine 40. This allows the automated workpiece carrying device including a gantry loader or the like to easily pass through between the tip of the tool 2 gripped by the tool magazine 40 and the cover member C of the machining center 1 disposed to be opposed to the tool magazine 40. Accordingly, the automated workpiece carrying device is able to place a workpiece on the workpiece placing part 20 and remove the workpiece placed on the workpiece.

The tool magazine 40 is rotatable centering on the magazine shaft part 151. The tool magazine retracting part has the rotary cam 175 rotatable centering on the retracting-part shaft part 153 parallel to the magazine shaft part 151, and the cam follower 413 which follows the cum surface 177 of the rotary cam 175 and has a support point on the tool magazine 40. This enables to reduce the impact generated at the time when the tool magazine 40 is rotated, as compared with, for example, the case where the tool magazine 40 is rotated by the air cylinder 171.

The cam surface 177 of the rotary cam 175 has a curved surface whose distance from the retracting-part shaft part 153 decreases gradually as the rotary cam 175 moves along the cam surface 177 centering on the retracting-part shaft part 153 of the rotary cam 175. This enables to more smoothly change the moving speed of the tool magazine 40 when the tool magazine 40 moves between the retreat position and the machining position, as compared with the case where the air cylinder 171 directly moves the tool magazine 40.

The tool magazine retracting part further includes the air cylinder 171 for rotating the rotary cam 175. Thus, the driving of the air cylinder 171 enables to rotate the rotary cam 175 to an appropriate rotation angle.

Although the embodiment according to the present invention has been described above, the present invention is not limited to the embodiment described above. The effects described in the present embodiment are listed merely as the most preferable effects produced by the present invention. The effects according to the present invention are not limited to those described in the present embodiment.

In an example, the configurations of respective parts in the present invention are not limited to the configurations of respective parts in the above-described embodiment. That is, the configurations of a tool magazine, a workpiece placing part, a spindle, a tool magazine retracting part, a controller and the like according to the present invention are not limited to the configurations of the tool magazine 40, the workpiece placing part 20, the spindle 30, the rotary cam 175, the cam follower 413, the air cylinder 171, the controller 60 and the like according to the present embodiment.

EXPLANATION OF REFERENCE NUMERALS

1 . . . MACHINING CENTER (MACHINE TOOL)
2 . . . TOOL
20 . . . WORKPIECE PLACING PART
30 . . . SPINDLE
40 . . . TOOL MAGAZINE
43 . . . TOOL GRIPPING PART
60 . . . CONTROLLER
151 . . . MAGAZINE SHAFT PART
175 . . . ROTARY CAM (TOOL MAGAZINE RETRACTING PART)
177 . . . CAM SURFACE
171 . . . AIR CYLINDER (TOOL MAGAZINE RETRACTING PART)
413 . . . CAM FOLLOWER (TOOL MAGAZINE RETRACTING PART)
C . . . COVER MEMBER (WALL PART)

What is claimed is:
1. A machine tool comprising:
a tool magazine having a plurality of tool grippers radially disposed about a center of the tool magazine, each of the plurality of tool grippers being capable of gripping a tool;
a workpiece support with a workpiece placed thereon and removed therefrom by an automated workpiece carrier, the workpiece to be machined by the tool; and
a spindle subjected to attachment of the tool for machining the workpiece on the workpiece support, wherein
the tool magazine is able to rotate between a machining position where the tool attached to the spindle machines the workpiece, a tool exchange position where the tool attached to the spindle is exchanged, and a retreat position where the automated workpiece carrier is not disturbed in placing the workpiece on or removing the workpiece from the workpiece support,
the workpiece is placed on the workpiece support from above or removed upward from the workpiece support by the automated workpiece carrier via a space located horizontally adjacent the tool magazine, wherein the tool magazine is configured such that when disposed in either the machining position or the tool exchange position, the automated workpiece carrier is precluded from accessing the workpiece support, and when the automated workpiece carrier is performing the placing of the workpiece on or the removal of the workpiece from the workpiece support, the workpiece support is disposed lower than the tool magazine, and the machine tool further comprises:

a tool magazine retractor for moving the tool magazine to the retreat position, and a controller for controlling, in synchronism with each other, an operation of placing the workpiece on or removing the workpiece from the workpiece support by the automated workpiece carrier and an operation of the tool magazine retractor.

2. The machine tool according to claim 1, wherein the machine tool further comprises:

a cover member including a wall part disposed so as to be opposed to the tool magazine in a horizontal direction, wherein the tool magazine retractor retracts the tool magazine so as to widen the space enough for the automated workpiece carrying device to vertically pass through between the wall part and the tool magazine.

3. The machine tool according to claim 1, wherein the tool magazine is rotatable about a magazine shaft part, and the tool magazine retractor has a rotary cam that is rotatable about a retracting-part shaft part, and a cam follower that follows a cam surface of the rotary cam, wherein the rotary cam has a support point on the tool magazine, and the retracting-part shaft part extends parallel to the magazine shaft part.

4. The machine tool according to claim 3, wherein the cam surface of the rotary cam has such a curved surface that, as the rotary cam moves along the cam follower, a distance from the retracting-part shaft part to the cam surface decreases gradually.

5. The machine tool according to claim 3, wherein the tool magazine retractor includes an air cylinder for rotating the rotary cam.

\* \* \* \* \*